United States Patent
Kotecha et al.

(10) Patent No.: US 10,277,349 B1
(45) Date of Patent: Apr. 30, 2019

(54) METHOD AND APPARATUS FOR FAST AND ROBUST CELL SEARCH FOR 5G AND MILLIMETER-WAVE WIRELESS COMMUNICATION SYSTEMS

(71) Applicant: NXP USA, Inc., Austin, TX (US)

(72) Inventors: Jayesh H. Kotecha, Austin, TX (US); Jayakrishnan C. Mundarath, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/966,456

(22) Filed: Apr. 30, 2018

(51) Int. Cl.
H04B 7/08 (2006.01)
H04J 11/00 (2006.01)

(52) U.S. Cl.
CPC .......... *H04J 11/0086* (2013.01); *H04B 7/088* (2013.01); *H04B 7/0857* (2013.01)

(58) Field of Classification Search
CPC .............................. H04B 7/0857; H04B 7/088
USPC ......................................................... 375/267
See application file for complete search history.

(56) References Cited

U.S. PATENT DOCUMENTS

| | | | |
|---|---|---|---|
| 2015/0358129 A1* | 12/2015 | Ryu | H04L 5/0023 455/438 |
| 2017/0094624 A1 | 3/2017 | Balachandran et al. | |
| 2017/0251460 A1* | 8/2017 | Agiwal | H04W 72/0406 |
| 2018/0192384 A1* | 7/2018 | Chou | H04W 56/001 |

OTHER PUBLICATIONS

Marco Giordani et al., Comparative Analysis of Initial Access Techniques in 5G mmWave Cellular Networks, 2016 Annual Conference on Information Science and Systems (CISS), Mar. 16-18, 2016.
Vip Desai et al., Initial Beamforming for mmWave Communications, 2014 48th Asilomar Conference on Signals, Systems and Computers, Nov. 2-5, 2014.
C. Nicolas Barati et al., Directional Initial Access for Millimeter Wave Cellular Systems, 2015 49th Asilomar Conference on Signals, Systems and Computers, Nov. 8-11, 2015.
Joongheon Kim et al., Fast Millimeter-Wave Beam Training with Receive Beamforming, Journal of Communications and Networks, vol. 16, No. 5, Oct. 2014.

* cited by examiner

*Primary Examiner* — Michael R Neff (57) ABSTRACT

A millimeter-wave wireless multiple antenna system (200) is provided in which a UE (210) uses a multi-antenna subsystem (211) to sweep a plurality of receive beams (RX1-RXM) during each transmit beam in a plurality of transmit beams (TX1-TX64) used by the base station (201) to transmit an SSB, and then generates, for each receive beam, a received signal strength indicator (RSSI) value from samples of each transmitted SSB measured in said receive beam, thereby generating a plurality of RSSI values from which an optimal receive beam is selected based on a ranking of the RSSI values and then used to lock the UE (210) onto the optimal receive beam to perform a cell search which matches a transmit beam from the base station (201) to the optimal receive beam.

24 Claims, 5 Drawing Sheets

METHOD AND APPARATUS FOR FAST AND ROBUST CELL SEARCH FOR 5G AND MILLIMETER-WAVE WIRELESS COMMUNICATION SYSTEMS

BACKGROUND OF THE INVENTION

Field of the Invention

The present invention is directed in general to field of information processing. In one aspect, the present invention relates to an apparatus, system and method for initial cell acquisition in next generation millimeter-wave cellular communication systems.

Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to increasing throughput in wireless communication links. With next-generation wireless systems, such as the 5G wireless network technologies being deployed in 2018 and later, millimeter-wave (mm-wave) data transmission has emerged as a highly promising approach to achieving gigabit/s throughput in wireless communications links by offering orders of magnitude more spectrum than the congested bands in conventional UHF and microwave frequencies below 3 GHz. However, with extremely high carrier frequencies, mm-wave signals experience poor propagation and high path-loss. To overcome the large isotropic path loss, mm-wave signal schemes rely heavily on highly directional transmissions. With advances in CMOS RF circuits which enable large numbers of electrically steerable antenna elements, beamforming can be used to achieve cell coverage by directionally transmitting and receiving mm-wave communications. However, the use of directional transmissions significantly complicates the requirement of initial access—the procedure by which a mobile (or user equipment (UE) in 3GPP terminology) discovers a potential cell and establishes a link-layer connection with the corresponding base station (BS). In addition to the mutual detection of the BS and the UE, the initial access procedure in mm-Wave cells must provide a mechanism by which both the UE and the BS can determine suitable beamforming directions on which subsequent directional communication can be carried out. Directional beamforming transmissions typically have a tradeoff between coverage range and beamwidth/number of transmission beams, because using narrower beams to realize very high beamforming gains requires a larger number of beam directions, which slows down the initial access process due to a larger angular search. This increase in delay goes against one of the main objectives of mm-wave systems, which is to dramatically reduce both data plane and control plane latency.

While there are various mm-wave initial access design proposals for establishing initial beamforming directions between the UE and the BS, they typically use a synchronization signal block (SSB) that is periodically transmitted by the base station (gNB). However, even on the receive side there are design challenges with providing a robust cell search/acquisition strategy/procedure since existing solutions must balance the acquisition time (latency constraint) against the acquisition probability (coverage constraint). For example, increases in acquisition probability (and thus, coverage) are typically achieved by using the sharpest receive beams possible, which in turn proportionally scales up the number of receive beams to search over, thereby increasing the acquisition time. With a brute force solution of searching over all receive beams, the best coverage is achieved, but at the expense of a maximum worst case (and average) latencies. These worst case latencies are also linearly proportional to the number of transmission beams using by the base station. And while latency can be reduced by compacting the search space to search over wider (but fewer) beams, this will result in reduced coverage. As seen from the foregoing, the existing initial access solutions for mm-wave systems are extremely difficult at a practical level by virtue of the challenges with performing fast and robust cell searches for 5G and mm-wave wireless communication systems, especially as the number of transmit and receive beams increase with next-generation wireless systems, increasing directional initial access tradeoffs between delay performance and coverage.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An apparatus, system, architecture, methodology, and program code are described for accurately and efficiently performing a cell search at the user equipment side (UE) for next generation mm-wave cellular systems, including but not limited to 5G New Radio (5G-NR). In selected embodiments, a two-step approach is disclosed for achieving maximum robustness (coverage) that selectively enables the use of receive (RX) beams with maximum selectivity while achieving significantly reduced acquisition times by continuously performing a periodic RX beam sweep at the UE. In the first step, the UE sweeps through all of its RX beams during each transmit TX beam in a manner such that the UE can calculate a received signal strength indicator (RSSI)

value (or some such metric based on received power or energy) for each RX beam to identify the best RX beam(s) (e.g., the RX beam(s) having the maximum power based on the calculated RSSI value) for the synchronization signal blocks (SSB) transmitted on each of the TX beams. In the second step, the UE locks on to the identified RX beam(s) to perform a synch-based acquisition with the base station, such as by performing a cell-search round that uses each identified RX beam to search for a synch pattern on the strongest transmit (TX) beam. In selected embodiments, a user equipment receiver sweeps continuously through M RX beams in a circular round robin manner and calculates specified RSSI measurements on each RX beam during a first SSB burst. To calculate the RSSI values, the UE may include an analog filtering multi-antenna millimeter-wave subsystem and analog beamforming array which is reconfigurable to continuously collect samples by listening across the "M" RX beams in a time-multiplexed, round robin manner during each transmitted SSB in an SSB burst which transmits multiple SSBs on a plurality of transmit SSB beams. Each transmitted SSB of the first SSB burst is then processed at the UE with a millimeter-wave transceiver/receive front end and associated antenna signal processor which sweeps M RX beams during the transmitted SSB under control of one or more processors (e.g., vector processors) and associated memory for performing receive signal processing on M sets of samples received from the transceiver/front end to calculate RSSI values for each of M RX beams. For example, the antenna signal processor may use a vector processor to initialize a metric vector $r_M=[0\ 0\ \ldots\ 0]^T$ and then generate a plurality of receive vectors— $(x_n=[x(nN_{SSB})\ x(nN_{SSB}+1)\ \ldots\ x(nN_{SSB}+N_{SSB}-1)]^T$, $c_{n,m}=[x(nN_{SSB}+mK)\ x(nN_{SSB}+mK+1)\ \ldots\ x(nN_{SSB}+mK+K-1)]T$, and $z_{n,m}=[C_{n-1,m}{}^T\ c_{n,m}{}^T]^T$—from the input sample stream to compute a power measure, $p(n, m)=\max_{l\in\{0, 1, \ldots, K\}}\|z_{n,m}(l)\|^2$ for each $m=0, 1, \ldots, M-1$ for every round robin period, n—in order to update the metric vector $r_M(m)=p(n, m)$, if $p(n, m)>r_M(m)$, for each $m=0, 1, \ldots, M-1$ through an iterative loop sequence that is repeated by incrementing "n" for a full SSB burst period. Here, $N_{SSB}$ refers to the number of samples gathered in a duration equal to the length of a SSB, and in the selected embodiment as described above, a single round robin RX sweep period is chosen to be equal to $N_{SSB}$. To account for possible misalignments between sample collection and the SSB boundary edges, RSSI measurements may be accumulated over multiple RX sweep periods to look for peaks in "adjacent sweep blocks." After completion of sampling the SSB burst(s), the metric vector $r_M$ is sorted to identify the "best" RX beam having the largest power metric value, at which point, the UE may fix the identified "best" RX beam to perform a correlation-based cell search to identify the best SSB transmit beam. Thus, the antenna signal processor may be embodied with program code running in the processor (or a host CPU) and/or hardware accelerator circuitry to control the first round of "quick" sweeps across "M" RX beams to make RSSI measurements for identifying the best "RX" beam based on the beam that picks up maximum power. As will be appreciated by those skilled in the art, the above-described approach can readily be generalized for any length of a single RX beam round robin sweep period that is less than or equal to $N_{SSB}$ in which multiple RSSI measurements may be made for each RX beam. In selected embodiments, the RSSI (or some such power or energy metric) is calculated on candidate frequency domain bands corresponding to a partial part or parts of the transmitted signal bandwidth.

Figure 1:
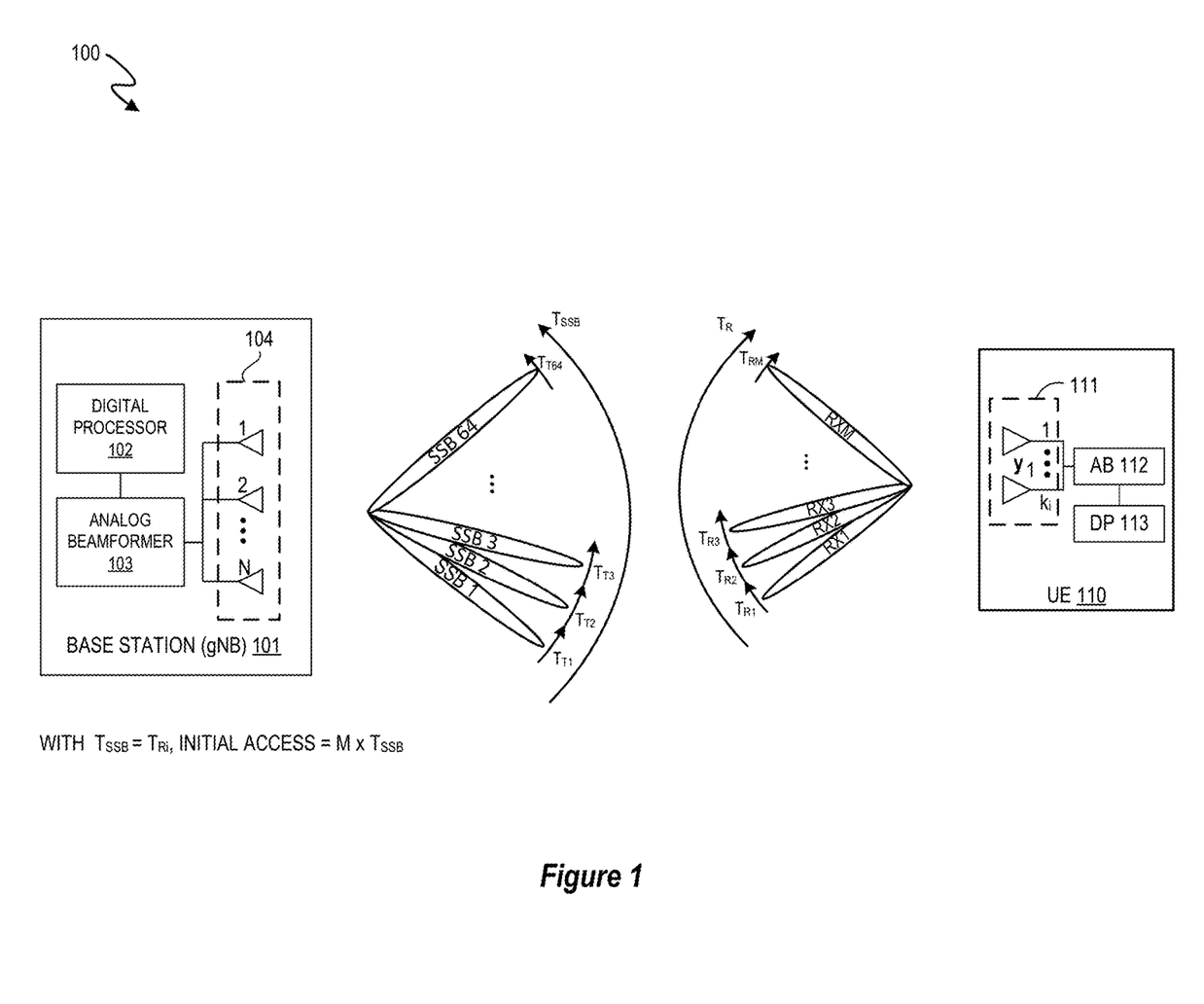
FIG. 1 depicts a wireless communication system which uses a conventional synchronization procedure between a base station (BS) and user equipment (UE).

To provide additional details for an improved contextual understanding of the present disclosure, reference is now made to FIG. 1 which depicts a wireless communication system 100 in which a base station (BS) 101 and user equipment (UE) 110 are each equipped, respectively, with transmit/receive multi-antenna array systems 104, 111. In a given geographic area, the wireless communication system 100 may include one or more transmitters 101 (e.g., base stations) to communicate with one or more receiver stations 110 (e.g., subscriber stations) by equipping the base station(s) 101 and subscriber station(s) 110 with transmitters and receivers. In selected embodiments, the base station 101 uses beamforming techniques to transmit one or more data streams through the transmit antenna array 104, and the receiver 110 combines the received signal stream(s) from the receive antenna array 111 to reconstruct the transmitted data. This is accomplished with "beamforming" weights whereby each data signal $s_i$ is processed by a digital signal processor 102 and analog/digital beamformer 103 for transmission by applying a weight vector $w_i$ to the signal $s_i$ and transmitting the result $x_i$ over the transmit antenna array 104. The weighting vector $w_i$ is used to directionalize the signal with the objective of enhancing the signal quality or performance metric, like signal-to-interference-and-noise ratio (SINR) of the received signal at the receiver station 110. At the receiver station 110, the received signals detected at the receive antenna array 111 are processed using a combining vector $v_i$ that is applied by the analog beamformer units (AB) 112 and digital signal processor (DP) 113. In an example embodiment where the base station 101 has an array of N transmit antennas 104, the digital signal processor 102 and analog beamformer 103 prepare a transmission signal, represented by the vector $x_1$, for each signal $s_i$. The transmission signal vector $x_i$ is determined in accordance with equation $x_i=w_i\cdot s_i$, where $w_i$ is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna 104.

At the subscriber station 110, the transmitted signals are received on the $k_i$ receive antennas in the receive antenna array 111. For example, the transmission signal vector $x_1$ is transmitted via a channel represented by a channel matrix $H_1$, and is received at the receiver 110 as a receive signal vector $y_1=H_1{}^H x_1+n_1$, where $n_1$ represents noise and any co-channel interference caused by other subscriber stations, and "$H_1{}^H$" represents the complex conjugate transpose of the channel matrix correlating the base station 101 and the subscriber station 110. The superscript "H" is used herein as a hermitian operator to represent a complex conjugate transpose operator. The $j^{th}$ element of the received signal vector $y_1$ represents the signal received on the $j^{th}$ antenna of subscriber station 110, $j\in\{1, 2, \ldots, k_i\}$. To obtain a data signal, $z_1$, which is an estimate of the transmitted data $s_1$, the digital signal processor (DP) 113 and analog beamformer (AB) 112 at the subscriber station 110 combine the signals received on the $k_i$ antennas of the array 111 using a combining vector $v_1$ in accordance with the equation, $z_1=y_1{}^H v_1$.

With emerging 5G wireless communications, massive MIMO techniques are proposed for using antenna arrays 104, 111 which include arrays of elements driven by individual signals to create multiple signal beams over multiple paths. At the location of the receiver 110, signals from all these paths may be added constructively to enabling a high data rate by using multichannel phase shifting techniques to combine the signals from the multiple paths. In selected analog antenna embodiments, multichannel phase shifting can be done in the analog domain, by taking the transmit data stream, dividing it as many ways as there are elements in the antenna array, and then applying phase shifting to each of them. But due to the inflexibility of such analog systems which can only handle one data stream and generate therefrom one signal beam, another digital antenna approach provides each element of the antenna array with its own transceiver and set of data converters, thereby providing the ability to handle multiple data streams and generate multiple beams from one array.

With the increasing reliance on directional transmit and receive beamforming techniques for overcoming high isotropic path loss with next generation mm-wave cellular communication systems, such as 5G-NR, there are associated control and setup challenges for such systems. For example, initial access procedures can be significantly delayed due to the need for the BS and the UE to find the initial directions of transmission. With typical cell acquisition techniques where the UE 110 relies on a synchronization signal block (SSB) to acquire initial access, the base station (gNB) 101 will transmit, periodically or aperiodically, the SSB on each beamformed TX beam, thereby forming an SSB burst which has a specified SSB duration (specifying the total time for transmitting SSBs spanning the entirety of all supported TX beams/directions) and a specified SSB period (specifying the periodic repetition rate between SSB bursts). In the example of FIG. 1, each SSB burst includes SSB transmissions that are sent on 64 TX beams (e.g., SSB 1-SSB 64). With each SSB transmission having a fixed length ($T_B$) occurring within a time span of fixed duration ($T_{Ti}$), the multiple SSB transmissions ($T_{T1}+T_{T2}+\ldots T_{T64}=T_{SSB}$) in each SSB burst will have a specified SSB burst duration (e.g., 5 ms) that is less than the SSB burst period, $T_{SSBPERIOD}$, (e.g., 20 ms) for periodically repeating each SSB burst.

With conventional synchronization protocols, the UE 110 can listen for an SSB transmission on one its configurable RX beam by tuning its antenna array system 111 to listen for an SSB burst on each RX beam. For example, if M is the maximum number of RX beams that the UE 110 can support, then the UE may configure the antenna array system 111 to listen on a first receive beam RX1 during a first SSB burst, and then to listen on a second receive beam RX2 during a second SSB burst, and so on until the antenna array system 111 is configured to listen on the Mth receive beam RXM during an Mth SSB burst. As a result, the period of an SSB burst ($T_{SSBPERIOD}$) corresponds roughly to the duration of each RX beam ($T_{Ri}$), resulting the total time for making initial access as $M \times T_{SSBPERIOD}$. While such an initial access approach maximizes the acquisition probability (coverage constraint) by using the sharpest RX beams possible, it does so at the expense of the acquisition time (latency constraint). And the design challenge for providing a robust cell search/acquisition strategy/procedure which minimizes the acquisition time (latency constraint) while maximizing the acquisition probability (coverage constraint) are made even more difficult as the number of RX beams increases, thereby increasing the acquisition time required to search over all RX beams. While some initial access solutions have proposed to reduce the latency by compacting the search space at the UE to search over wider (but fewer) beams, this approach will reduce the coverage without minimizing acquisition latency.

Figure 2:
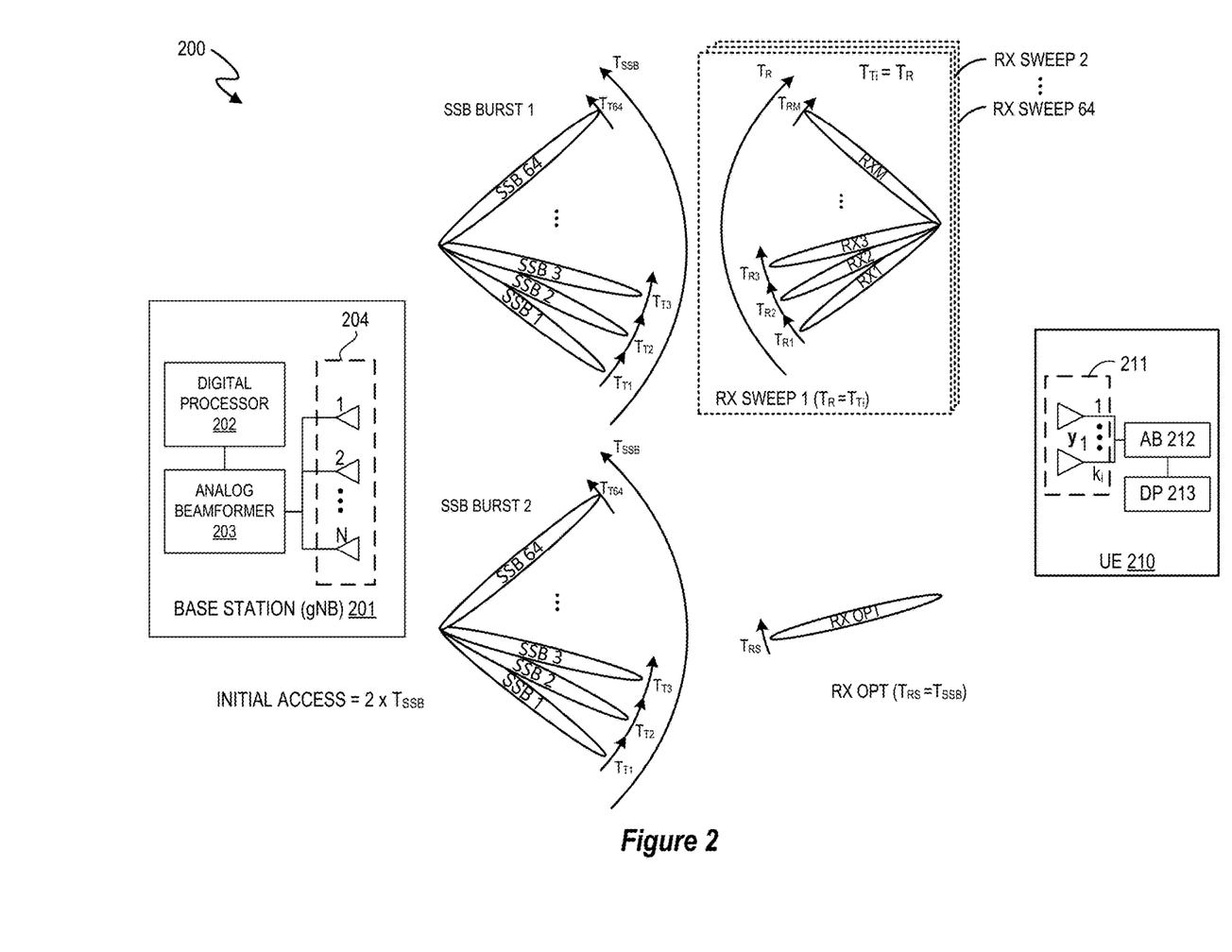
FIG. 2 depicts a wireless communication system which uses a fast and robust cell search synchronization procedure between a base station and user equipment in accordance with selected embodiments of the present disclosure.

To address these design challenges and other limitations from conventional approaches for making initial acquisition, reference is now made to FIG. 2 which depicts a wireless multi-antenna communication system 200 in which selected embodiments of the present disclosure may be used to perform a fast and robust cell search synchronization procedure between a base station 201 and user equipment 210. Equipped with one or more digital signal processor units 202, analog beamformer units 203, and transmit antenna array 204, the base station 201 is configured to periodically transmit a synchronization signal block (SSB) on each of a plurality of transmit beams (e.g., SSB 1-SSB 64) as part of an SSB burst, having a SSB burst duration ($T_{SSB}$) and periodic SSB burst period ($T_{SSBPERIOD}$). With each fixed length SSB transmission in a transmit beam occurring within a fixed time period (e.g., $T_{T1}, T_{T2}, \ldots T_{T64}$) on a given time and frequency grid, the combination of SSB transmissions over every transmit beam during an SSB burst has a total SSB burst duration of $T_{SSB}=T_{T1}+T_{T2}+\ldots T_{T64}$, so that SSB bursts are transmitted regularly with a SSB burst period $T_{SSBPERIOD}$ that is longer than the SSB burst duration $T_{SSB}$. While selected embodiments illustrated in FIG. 2 show the use of analog beamformer techniques, it will be appreciated that digital beamformers can also be used to control the antennas 204.

To expedite the initial acquisition process, the user equipment 210 is equipped with analog beamformer (AB) 212 and digital signal processor (DP) 213 which implement a two-stage cell search process, where the user equipment continuously sweeps across all M RX beams in a circular round robin manner throughout the duration of each SSB burst period during a first stage to identify an RX beam having a maximum calculated RSSI value (or multiple RX beams having the strongest RSSI values), and then locks onto the identified RX beam(s) to perform a synch based acquisition in a second stage. In other embodiments, the first stage processing may be extended to span multiple SSB bursts at the end of which the maximum RSSI value is used to lock on to the best RX beam(s) for subsequent synch based acquisition in a second stage. To implement the first stage of the cell search, the digital signal processor (DP) 213 and analog beamformer (AB) 212 configure the receive antenna beamforming weights to continuously sweep across all M receive beams (e.g., RX1-RXM) in a round robin manner such that the length of each sweep period $T_R$ (a single period covering all M RX beams) is aligned to the length of an SSB transmission in a single transmit TX beam. In other words, the duration of the initial sweep at the user equipment 210 ($T_R$) corresponds roughly to the fixed duration of each SSB transmission ($T_B$). This reflects the fact that SSB transmissions on different TX beams will have the same SSB duration, but are not necessarily continuous or distributed evenly with the SSB burst. As a result, two successive SSB transmissions on two different TX beams will occur at periods ($T_{Ti}$), but they do not necessarily occupy the entire $T_{Ti}$ length. Rather, they may occupy a sub-interval t of the $T_{Ti}$ duration, i.e ($T_B<=T_{Ti}$). In other embodiments, the duration $T_{Ti}$ of each TX beam may correspond to the duration of each SSB being transmitted.

During each receiver sweep (e.g., RX Sweep 1), the user equipment is configured to measure or calculate a specified received signal strength indicator (RSSI) value from each receive beam within the receive sweep. For example, a first RSSI value is measured during the first receive RX beam (RX1), a second RSSI value is measured during the second receive RX beam (RX2), and so on until the Mth RSSI value is measured during the Mth receive RX beam (RXM). To account for possible misalignment between the timing of a receiver sweep and the SSB, the RSSI value (or, any similar metric, based on say power or energy, calculated from the pertinent samples) calculated at an RX beam of a first receive sweep may be summed (or, combined using any general aggregation function) with the RSSI value (or, any similar metric calculated from the pertinent samples) calculated at the same RX beam of the next receiver sweep, thereby guaranteeing that the appearance of an SSB within a RX beam is completely captured by the metric. As described more fully hereinbelow, the signal processing unit(s) 212 may use any desired processing techniques (e.g., scalar or vector processing) to identify the maximum RSSI value for each RX beam over the entirety of one or more SSB bursts period. For example, at the end of each SSB burst period, the vector signal processing unit(s) 212 generates a vector $r_M$ of M metric values from the calculated RSSI values measured during each receive RX beam, identifies a maximum among the M metrics which exceeds a predefined threshold, and then selects the receive RX beam corresponding to the identified maximum metric value as the "best" or optimal RX beam. In other embodiments, the best top N candidates are chosen that correspond to the best N Rx beams so that the best N Rx beams are identified in the first stage.

Generally speaking, the first stage computations can be based on one or more SSB bursts by making continuous circular round robin M RX beam sweeps across one or more SSB burst periods. For example, multiple SSB bursts could be used by processing the samples with the RX beam sweep until the computed RSSI metric meets a specified threshold. In addition or in the alternative, RSSI values could be computed over multiple SSB bursts in order to compute average RSSI values across successive burst periods to improve signal-to-noise ratio performance. In yet other embodiments, M/2 RX beam sweeps could be conducted in a first SSB burst (or 1 thru B/2 burst periods), with the remaining M/2 RX beam sweeps being conducted in the second SSB burst (or burst periods B/2 to B). In general, M/P RX beam sweeps can be conducted in a SSB burst (where M/P>1 is an integer for some integer value P) in such a way so that all M beams are sweeps over R≥P bursts. By processing more than one RX beam in one SSB period, first stage latency is reduced.

To implement the second stage of the cell search, the digital signal processing unit 213 configures the receive beamformer unit 212 with beamforming weights to lock onto the "best" or optimum RX beam that is selected in the first search stage. In embodiments where multiple receive RX beams are identified in the first stage (e.g., RX beams having computed RSSI values exceeding a minimum threshold), each or some of the multiple receive RX beams may be used for cell search. For example, each of the multiple RX beams may be sequentially used, strongest one first, to perform the cell search until the cell search goals are achieved. In another example, the cell search may be performed with a weighted linear combination of some of the identified RX beams where the weighting could be based on the received signal strength metric. With the receiver antenna array 211 locked onto the optimal receive RX beam (RX OPT), the user equipment 210 then performs a correlation-based cell search during a second SSB burst from the base station 201. In particular, the user equipment 210 is configured to monitor, during a listening interval for the selected receive beam ($T_{RS}$), each of transmit TX beams from the base station 201 during a second SSB burst. In this second stage, the duration of the listening interval ($T_{RS}$) corresponds roughly to the duration of a second SSB burst period ($T_{SSBPERIOD}$). Again, it will be appreciated that the above-described procedure can be generalized to enable the second stage to span more than one SSB burst periods. In other embodiments, the cell search procedure is repeated across several SSB bursts where the cell search is conducted with each of the different best Rx beams identified in the first stage.

Figure 3:
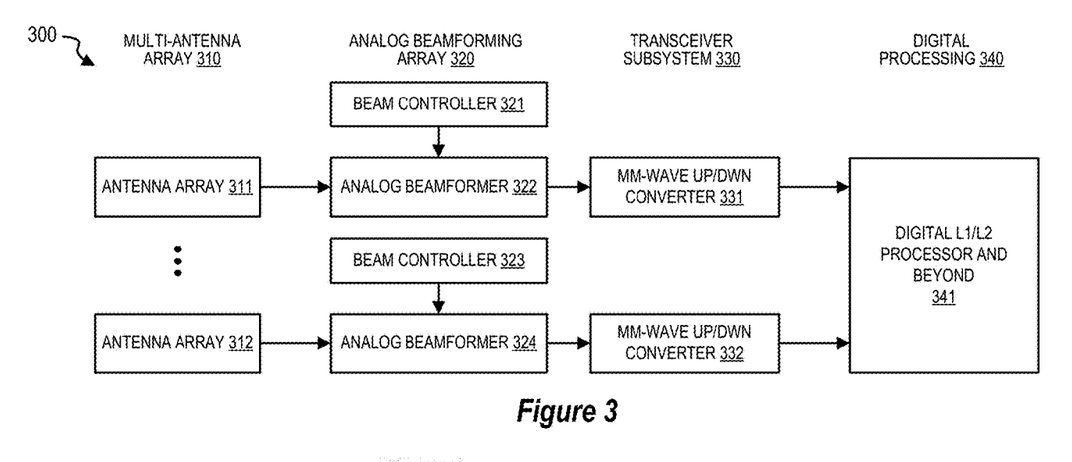
FIG. 3 is a block diagram illustration of a user equipment system having a reconfigurable filtering multi-antenna millimeter-wave subsystem with analog beamforming for performing cell search in a user equipment subsystem in accordance with selected embodiments of the present disclosure.

To provide additional details for an improved understanding of selected embodiments of the present disclosure, reference is now made to FIG. 3 which is a simplified block diagram illustration of a user equipment system 300 having one or more reconfigurable multi-antenna array subsystems 310 and one or more analog beamforming array subsystems 320 connected over one or more transceiver subsystems 330 to a digital processing subsystem 340 which is configured to perform the two-stage cell search method disclosed herein. To this end, each multi-antenna array subsystem 310 includes a plurality of configurable antenna array elements 311-312, where each may include a reconfigurable bandpass filter within the feeding line of an antenna element (e.g., filtenna). When receiving or transmitting signals over the multi-antenna array subsystem 310, the analog beamformers 322, 324 may apply analog beamforming weights under control of the beam controller units 321, 323. The output(s) from the analog beamformers 322, 324 may be connected to a millimeter-wave up/down converter 331, 332 in transceiver subsystem 330 that provides signal processing and conversion to/from baseband via additional filtering stages, up/down conversion stages, ADC/DAC etc. The digital output from the transceiver subsystem 330 is streamed to the digital L1 processor subsystem 341 that performs baseband processing commensurate with the physical layer processing requirements of the communication protocol. The L1 processor outputs are subsequently processed by a second processor subsystem that can perform processing commensurate with the requirements for layers 2 and higher as stipulated by the communication standard. It should be appreciated that the L1 processor blocks can be implemented via one or more DSP cores, custom ASICs, or, one or more generic vector processors. Likewise, the L2 and higher layer processors can be implemented via one or more DSP or application processor cores.

Under control of the digital processing subsystem 340, the analog beamformers 322, 324 are configured to apply beamforming weights so that the analog multi-antenna array subsystem 310 sweeps through M receive beams continuously in a circular round robin fashion throughout the duration of an SSB burst period. During each receiver beam sweep, the digital L1 processor 341 is configured to measure K samples for each receive RX beam over a defined receive sampling duration $T_R = T_{R1} + T_{R2} + \ldots T_{RM}$, where the sampling duration $T_R$ that matches the length of the SSB block that is transmitted on each transmit TX beam within each SSB period $T_B$. Based on measurements over a predetermined time duration on one or more of the consecutive K sample sub-blocks for each receiver RX block, the digital L1 processor 341 may determine which receive RX beam recorded the highest power when scanning for the presence of an SSB block, thereby identifying the best or optimal receive RX beam for performing initial access, at which point the multi-antenna array subsystem 310 is configured with beamforming weights to lock onto the selected receive RX beam when performing a synch-based acquisition of the best SSB for the initial access. To address potential misalignment between the receiver beam sweep and an SSB transmitted in a given transmit TX beam, the digital processor subsystem 340 may use sample measurements from one or more consecutive RX beam sweeps to calculate the metric used to identify the strongest beam.

Figure 4:
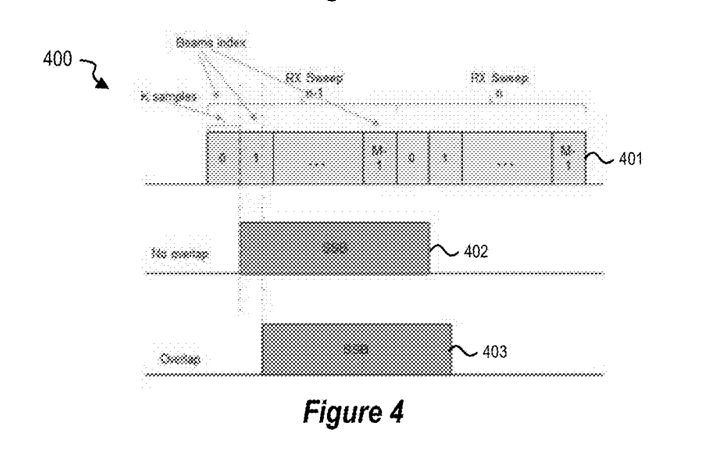
FIG. 4 is a timing diagram illustrating different beam sweep scenarios in accordance with selected embodiments of the present disclosure.

To provide additional details for an improved understanding of how to account for potential misalignment between a receiver beam sweep and an SSB transmitted in a given transmit TX beam, reference is now made to FIG. 4 which is a timing diagram 400 illustrating different beam sweep scenarios in accordance with selected embodiments of the present disclosure. As shown in the signal waveform 401, the user equipment continually listens for an SSB transmission on M receive RX beams (M≥1) by configuring the multi-antenna array with beamforming weights to take K sample measurements at each receive RX beam having a corresponding receive beam index (0, 1 . . . M−1). Once a first receiver beam sweep (RX Sweep n−1) is completed, the multi-antenna array is reconfigured to continue taking samples in a time-multiplexed round-robin manner by immediately performing a second receiver beam sweep (RX Sweep n), and so on. By setting the duration of one round robin sampling period (the time to cycle through all M beams) to match the duration of an SSB transmission, then each round robin sampling period collects "M" sets of samples, each corresponding to one of the RX beam directions. In this round-robin sampling mode, an SSB transmission from an SSB burst will be "visible" in the correct or pth RX beam (where p is one of 1, 2, . . . , M). However, depending on the alignment of the exact start of the SSB relative to a round robin period, the chunk of the SSB that is visible through "p" may either be entirely contained within the $p^{th}$ bin of a single round robin period (non-overlapping case), or, may span the $p^{th}$ bins of 2 contiguous round robin periods (overlapping case). In the non-overlapping case, the start of the SSB 402 aligns exactly with one of the sampling periods (e.g., beam index 1). However, in the overlap case, the start of the SSB 403 is not aligned with the start of a sampling period, and instead starts partway through a sampling period (e.g., during beam index 1). This property arises as a consequence of selecting the round robin period to match the SSB duration, as illustrated in FIG. 4.

In order to cover all possible alignment scenarios, sample measurements from the receiver beam sweep are collected for each of M bins across two consecutive round robin periods (e.g., RX Sweep n−1 and RX Sweep n). As a further optimization, the sample measurements from receiver RX block bins in two sampling periods are not simply added together, but are instead processed to choose a half subset of continuous samples within the two period window that gives a maximum power measurement. This helps improve the SNR of the sample measurements by not counting the "all noise, no signal" samples within the two period window.

Figure 5:
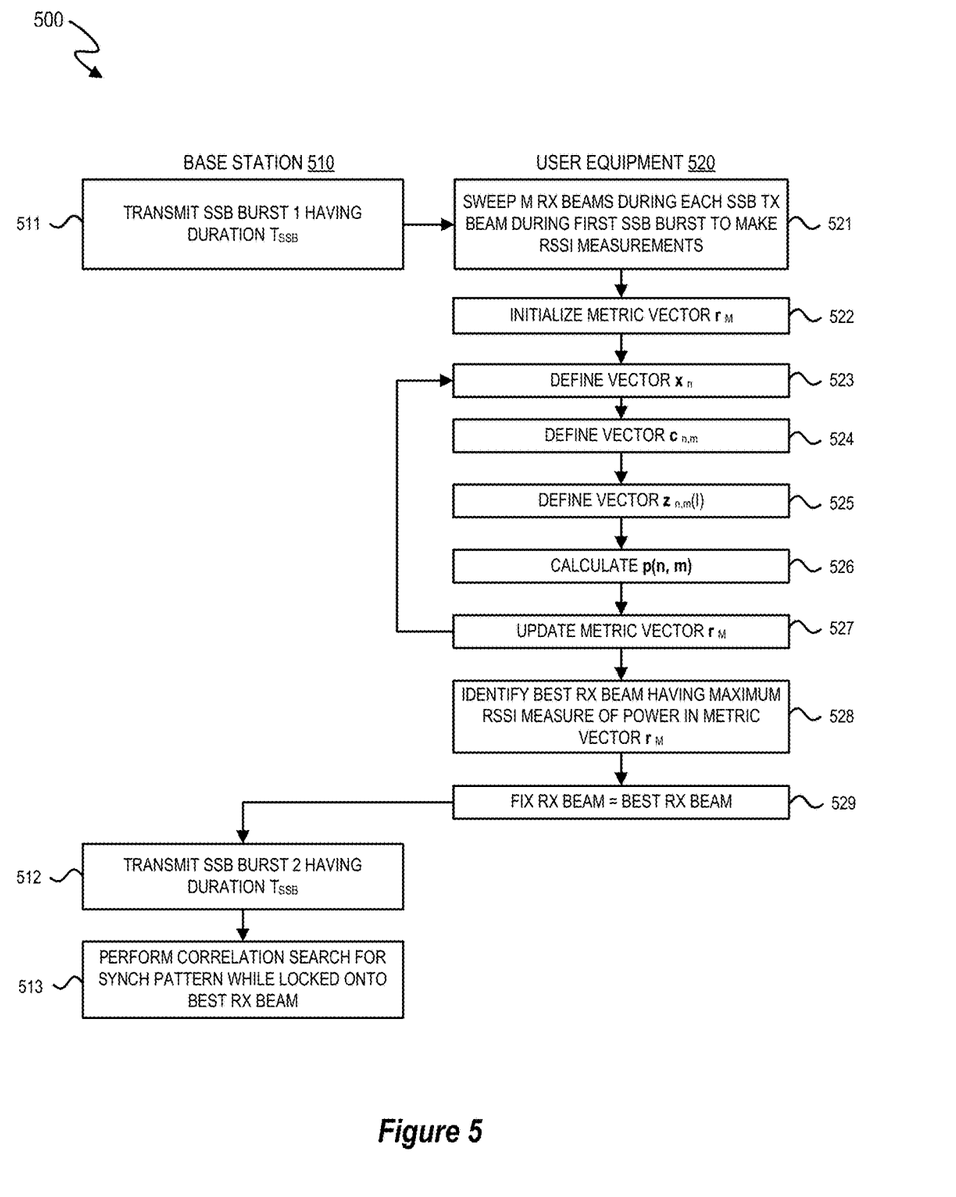
FIG. 5 is a simplified flow chart showing the logic for establishing mm-wave initial access between a base station and user equipment in accordance with selected embodiments of the present disclosure.

Referring now to FIG. 5, there is depicted an example flow diagram 500 of a method for establishing mm-wave initial access between a base station and user equipment in accordance with selected embodiments of the present disclosure. In the flow diagram 500, the method steps may be performed by programmable vector processing software, hardware and/or firmware having an vector processing hardware accelerator stages which are controlled by control logic (e.g., at the digital processing subsystem 340) to perform a first round of "quick" sweeps across "M" RX beams to compute predetermined received signal strength indicator (RSSI) values for each receive RX beam in a receiver beam sweep, and then use the computed RSSI values to identify an optimal receive RX beam based on the beam that picks up maximum power. The disclosed methods provide a compact, fast, and power efficient mechanism for achieving maximum robustness (coverage) and minimum acquisition times for establishing initial cell acquisition with next-generation mm-wave cellular communication systems, such as 5G-NR.

As a preliminary step, the base station 510 periodically transmits a Synchronization Signal Block (SSB) as part of a first SSB burst (step 511). As will be appreciated, each SSB occupies fixed time and frequency resources, and is transmitted in an SSB burst as independent SSB transmissions over a plurality of transmit TX beams from the base station 510 within a half-frame duration (e.g., 5 ms), where the half-frames carrying an SSB burst occur with a fixed periodicity (e.g., $T_{SSBPERIOD}$). In an example embodiment, an SSB burst from a base station 510 may include 64 independent SSB transmissions appearing on up to 64 independent transmit TX beams (corresponding to 64 different directions).

At step 521, the user equipment 520 can listen for an SSB transmission on one or more receive RX beams by configuring its antenna array accordingly. In this example, the maximum number of beams the UE can support (highest resolution case) is denoted by M. Instead of listening on a receive RX beam for the entirety of the SSB burst, the user equipment 520 may continuously sweep M receive beams during each SSB transmit TX beam of the first SSB burst to make specified received signal strength indicator (RSSI) measurements or calculations which provide a measure of the received signal power for each receive RX beam. While any suitable power or energy measurement technique may be used, an example RSSI calculation sequence may begin by collecting $N_{SSB}$ samples during the receive beam sweep (step 520), where $N_{SSB}$ is defined as the number of samples spanned by each SSB at the operational sampling rate of the user equipment 520. As a result, the UE 520 continuously listens on "M" RX beams in a round robin manner, with the UE 520 collecting K samples on each receive beam is K samples, where $K=N_{SSB}/M$. In a different embodiment, each round robin sweep may collect different number of samples (greater than or less than K) for each of the "M" RX beams while maintaining the constant duration of the round robin period.

To process the measurement samples, a metric vector $r_M$ is initialized at step 522. In an example implementation, the processing at step 522 may be performed by an antenna signal processor which includes vector processor which initializes an M-element metric vector, $r_M=[0\ 0\ \ldots\ 0]^T$ with zero values.

At step 523, a first receive vector $x_n$ is generated by the digital L1 processor by processing samples from the input sample stream. In an example implementation, the processing at step 523 defines the first receive vector as $x_n=[x(nN_{SSB}),\ x(nN_{SSB}+1),\ \ldots\ x(nN_{SSB}+N_{SSB}-1)]^T$, where $x(.)$ denotes the input sample stream and the first sample of each vector denotes the first sample of the nth round-robin receive RX beam sweep period.

At step 524, a second receive vector $c_{n,m}$ is generated by the digital L1 processor by processing samples from the input sample stream. In an example implementation, the processing at step 524 defines the second receive vector as $c_{n,m}=[x(nN_{SSB}+mK),\ x(nN_{SSB}+mK+1),\ \ldots\ x(nN_{SSB}+mK+K-1)]^T$, where $c_{n,m}$ denotes the input samples received in round-robin period n for receive RX beam m.

At step 525, a third receive vector $z_{n,m}$ is generated by the digital L1 processor by processing entries from the second receive vector $c_{n,m}$. In an example implementation, the processing at step 525 defines the third receive vector as $z_{n,m}=[c_{n-1,m}^T,\ c_{n,m}^T]^T$. If $z_i$ denotes the ith element of the third receive vector, then the processing at step 525 also generates a fourth receive vector may be defined as $z_{n,m}(l)=[z_l,\ z_{l+1},\ \ldots\ z_{l+K-1}]$.

At step 526, a power or energy metric value $p(n,m)$ is generated by the digital L1 processor by processing values from the fourth receive vector $z_{n,m}(l)$. In an example implementation, the processing at step 526 defines the power metric value $p(n,m)=\max_{l\in\{0, 1, \ldots K\}}\|z_{n,m}(l)\|^2$ for each m=0, 1, ... M−1 for every round-robin period n.

At step 527, entries in the metric vector $r_M$ are updated with larger values from the power metric value p(n,m). In an example implementation, the processing at step 527 updates the metric vector $r_M(m)=p(n,m)$ if $p(m,n)>r_M(m)$, for each m=0, 1, ... M−1. And as indicated by the feedback line to step 523, the steps 523-527 are repeated for every round-robin loop that is applied for every transmit TX beam in the SSB burst by updating the loop count n.

Once the full burst period is measured with steps 525-528, the processing proceeds to step 528 to identify the best receive RX beam having the maximum RSSI measure of power embodied in the metric vector $r_M$. For example, the antenna signal processor may generate a set $S_m=\{0, 1, \ldots M-1: r_M(m)>T\}$ that denotes the set of best receive RX beams for the current cell, where T is a pre-defined real threshold. Next, an optimal receive beam index, $m_O$, is chosen such that $m_O=\arg\max_{m\in Sm} p(n,m)$. If the set $S_m$ is empty and there is no maximum RSSI value, then steps 521-527 may be repeated.

With steps 521-527 being performed, a transmitted SSB on a transmit TX beam should be "visible" in the correct RX beam, say, p (p is one of 1, 2, ..., M). However, depending on the alignment of the exact start of the SSB relative to a round robin period when the receive beam sweep occurs, the chunk of the SSB that is visible through "p" may either be entirely contained within the $p^{th}$ bin of a single round robin period (non-overlapping case), or, may span the $p^{th}$ bins of two contiguous round robin periods (overlapping case). This property arises as a consequence of selecting the round robin period to match the SSB duration. To cover all the possible scenarios, RSSI values may be calculated from samples collected for each bin across one or more consecutive round robin periods by repeating steps 521-527 to accumulate RSSI measurements over multiple burst periods to look for peaks in "adjacent sweep blocks," thereby improving detection robustness under low SNR scenarios. And in selected embodiments, rather than considering all the samples for the bin from the two periods, a further optimization measures RSSI values for each bin by choosing a half subset of continuous samples within the two period windows that gives a maximum power measurement. This helps improve the SNR of our RSSI estimation by not counting the "all noise, no signal" samples within the two period window.

At step 529, the receive RX beam having the largest RSSI measure is selected and fixed as the "best" or optimal RX beam for receiving the SSB. At this point, the digital L1 processor may then fix the multi-antenna array to the receive RX beam corresponding to the optimal RX beam index $m_O$. Subsequently, the base station 510 transmits a second SSB burst having an SSB burst duration $T_{SSB}$ at step 512, and then the user equipment 520 performs a correlation-based cell search for the synch pattern at step 513 while locked onto the fixed receive RX beam.

Figure 6:
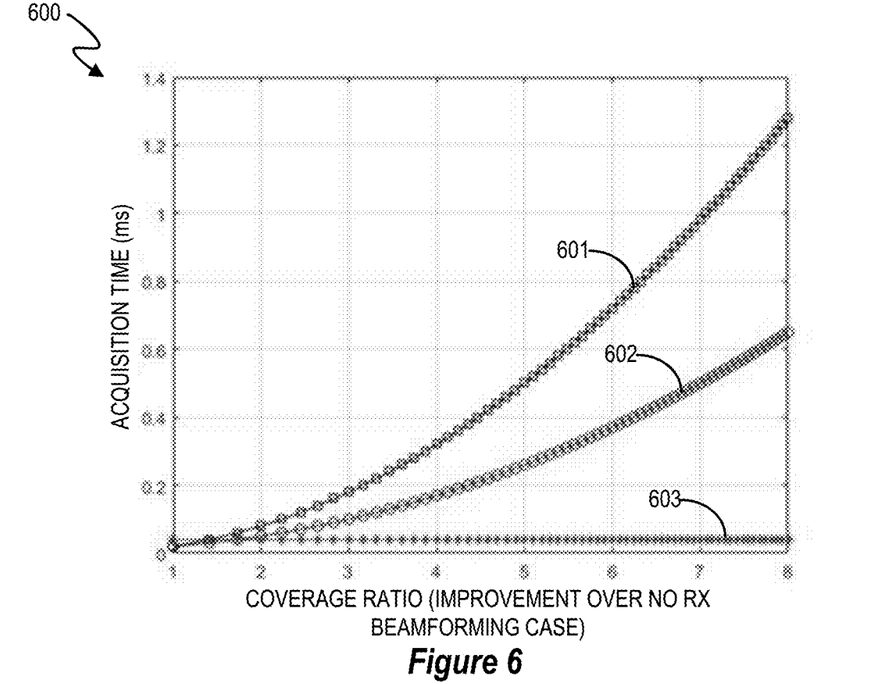
FIG. 6 depicts a graphical depiction of tradeoff curves between coverage and acquisition time.

Turning now to FIG. 6, there is shown a simulated comparison 600 of the coverage/acquisition tradeoff curves for different initial cell acquisition methodologies. As depicted, the first curve 601 depicts the worst-case acquisition time as a function of coverage which may be tuned by increasing the resolution of the receive RX beams (resulting in a larger number of receive RX beams to evaluate over), and the second curve 602 shows the average acquisition time with the base line approach. In both curves 601, 602, the initial cell acquisition time increases significantly as the number of coverage ratio increases. With existing approaches for establishing initial cell acquisition, the curves 601, 602 represent different operational points. For instance, a hierarchical two-step method which makes initial RSSI measurements by choosing a lower coverage point and then uses the low-resolution sector information to "zoom in" with a higher resolution results in a better acquisition time than by choosing the highest coverage point, but this approach suffers from many limitations including loss of coverage, such as with cell-edge users where the first stage may "miss" detection.

In contrast, the third curve 603 depicts the coverage vs acquisition time tradeoff achieved with the two-stage method for fast and robust cell search disclosed wherein the acquisition time is fixed, regardless of the coverage ratio. In particular, the computation of the RSSI values for each receiver RX beam during the first SSB burst allows the optimal receive RX beam to be identified within a single SSB burst period. And once the user equipment is turned to the optimal RX beam, the acquisition can complete within another SSB burst period (assuming the signal strength is sufficient), thus bounding the acquisition time to two SSB burst periods. As shown with the curve 603, the proposed two-stage initial acquisition method realizes maximum coverage (by using maximal receive beam resolution) with a fixed acquisition latency.

Figure 7:
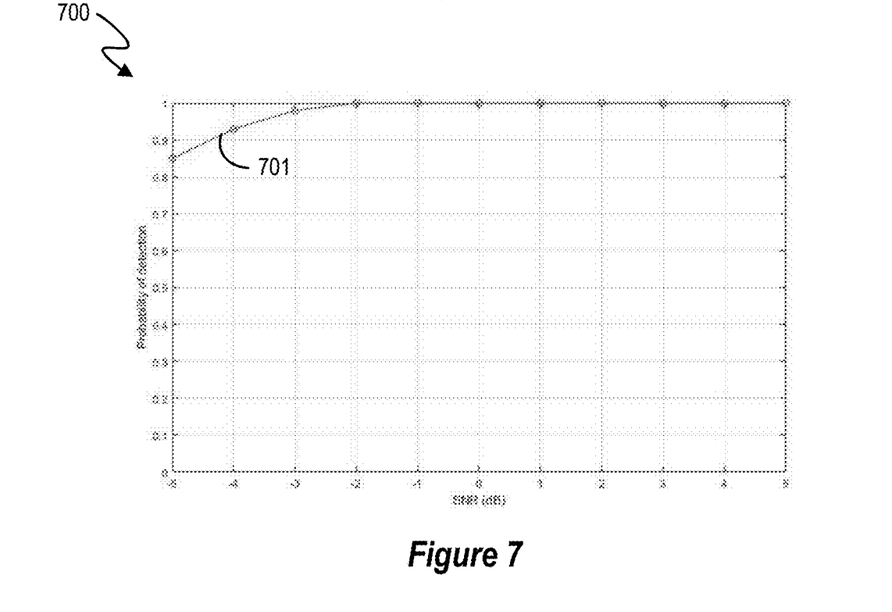
FIG. 7 depicts a graphical depiction of the probability of detection as a function of the signal-to-noise ratio.

Turning now to FIG. 7, there is shown a simulated graphical depiction 700 of the probability of detection as a function of the signal-to-noise ratio. In particular, the curve 701 shows that probability of detection of the correct receive RX beam within 1 SSB burst period approaches certainty as the signal-to-noise ratio exceeds −2 dB when using the disclosed two-stage method for fast and robust cell search. With the depicted simulations run under lowest range of SNRs characteristic of cell-edge users, it can be seen the detection performance is amazingly robust.

As these simulations show, optimal coverage with minimal acquisition latency and good SNR performance is achieved with the disclosed two stage initial acquisition approach which continuously sweeps the receive RX beams during each SSB transmit beam of a first SSB burst to compute RSSI values at each receive RX beam to find an optimal receive RX beam that is then used to perform correlation based search during a second SSB burst. And by integrating RSSI values across adjacent receive beam sweeps, the effective window used to calculate the receive RX beam power during initial cell acquisition is increased to improve detection robustness under low SNR scenarios, thereby improving overall system performance.

By now it should be appreciated that there has been provided an apparatus, method, program code, and system for making initial access between a user equipment (UE) device and a base station in a multi-antenna system, such as a next generation 5G millimeter-wave wireless system. In the disclosed embodiments, the UE device sweeps a plurality of receive beams over one or more receiver sweep periods to detect one or more synchronization signal blocks (SSB) transmitted by the base station in different transmit beams, where each receiver sweep period has a duration that equals a duration of each SSB transmitted at each transmit beam. In selected embodiments, the receive beams are swept by applying a plurality of receive beamforming weights to a multi-antenna subsystem at the user equipment device to directionally orient each of the plurality of receive beams in a different direction over the receiver sweep period. In other embodiments, the receive beams are swept by repeatedly sweeping the plurality of receive beams for adjacent receiver sweep periods to detect at least a first synchronization signal block (SSB) transmitted by the base station in a transmit beam in a plurality of SSB bursts. In yet other embodiments, the receive beams are swept by continuously sweeping a plurality of M receive beams in a circular round-robin fashion for N times to detect each synchronization signal block (SSB) transmitted by the base station. In selected embodiments, M equals the total number or receive beams at the UE device, but may be fewer (e.g., half) of the total number of receive beams. The UE device also generates, for each receive beam, a received signal strength metric, such as by generating received signal strength indicator (RSSI) values from samples of each transmitted SSB received in said receive beam, thereby generating a plurality of RSSI values. In selected embodiments, RSSI value is generated by collecting M sets of samples, each corresponding to one of M directional receive beams; and then computing an RSSI value from each of the M sets of samples, thereby generating, for each receive beam, a power or energy measure indication of whether the SSB is detected by said receive beam. In addition, the UE device selects one of the plurality of receive beams as an optimal receive beam based on a ranking of the plurality of RSSI values. In selected embodiments, the process of selecting one of the plurality of receive beams may include selecting the first receive beam as the optimal receive beam if the received signal strength metric exceeds a predetermined value. Finally, the UE device locks the UE device onto the optimal receive beam to perform a cell search, such as by matching a transmit beam from the base station to the optimal receive beam.

In another form, there is provided a wireless device (WD) and associated method of operation. The wireless device includes a multiple antenna subsystem and beamformer subsystem connected to and configured by a digital controller to wirelessly make initial access with an access node (AN). In selected embodiments, the multiple antenna system may include a millimeter-wave antenna array that is configurable for communicating with a millimeter wave radio access technology (mmW RAT) system. In other embodiments, the beamformer subsystem may be an analog beamformer or digital beamformer. In particular, the wireless device is connected and configured to sweep a plurality of receive beams over one or more receiver sweep periods at the WD to detect each synchronization signal block (SSB) transmitted by the AN in different transmit beams, where the receiver sweep period equals a duration of each SSB transmitted by the AN at each transmit beam. In selected embodiments, the digital controller is configured to sweep the plurality of receive beams by applying a plurality of receive beamforming weights to the multiple antenna subsystem to directionally orient each of the plurality of receive beams in a different direction over the receiver sweep period. In other embodiments, the digital controller is configured to sweep the plurality of receive beams by repeatedly sweeping the plurality of receive beams for adjacent receiver sweep periods to detect at least a first synchronization signal block (SSB) transmitted by the AN in a transmit beam in a plurality of SSB bursts. In other embodiments, the digital controller is configured to sweep the plurality of receive beams by continuously sweeping a plurality of M receive beams in a circular round-robin fashion for N times to detect each synchronization signal block (SSB) transmitted by the AN in different transmit beams, where the receiver sweep period for sweeping M receive beams equals a transmit beam duration for transmitting a single SSB. In addition, the wireless device is connected and configured to generate, for each receive beam, a received signal strength metric value, such as a received signal strength indicator (RSSI) value from samples of each transmitted SSB received in said receive beam, thereby generating a plurality of received signal strength metric values. The wireless device is also connected and configured to select at least one of the plurality of receive beams as an optimal receive beam based on a ranking of the plurality of received signal strength metric values. For example, the digital controller may choose at least one receive beam if the received signal strength metric value exceeds a predetermined value. Finally, the wireless device is connected and configured lock the WD onto the optimal receive beam to perform a cell search. In selected embodiments, an optimal beam is selected by selecting a first plurality of receive beams based on a ranking of the plurality of received signal strength metric values, and then the WD is locked onto the optimal receive beam by sequentially locking the WD onto each of the first plurality of receive beams, strongest one first, to perform a cell search.

In yet another form, there is provided a communication device, method, program code, and system for making initial access with a base station in a multiple antenna wireless communication system, such as a next generation 5G millimeter-wave wireless system. In the disclosed embodiments, the communication device includes a multi-antenna array, such as a millimeter-wave antenna array that is configurable for communicating with a millimeter wave radio access technology (mmW RAT) system. In addition, the communication device includes a beamformer module connected to apply a plurality of receive beamforming weights to the multi-antenna array to directionally orient each of a plurality of receive beams in a different direction over a receiver sweep period to continuously sweep the plurality of receive beams in a round robin manner during a first synchronization signal block (SSB) burst over one or more receiver sweep periods at the communication device to detect each synchronization signal block (SSB) transmitted by the base station in a plurality of transmit beams, where the receiver sweep period equals a duration of each SSB transmitted at each transmit beam. In selected embodiments, the beamformer module is configured to sweep the plurality of receive beams by repeatedly sweeping the plurality of receive beams for adjacent receiver sweeps to detect a synchronization signal block (SSB) transmitted by the base station in a transmit beam. The communication device also includes a digital signal processing controller connected to select at least one of the plurality of receive beams as an optimal receive beam based on a ranking of a plurality of received signal strength metric values, such as received signal strength indicator (RSSI) values, where each RSSI value is computed for each receive beam from samples of each transmitted SSB measured in said receive beam. For example, the digital signal processing controller may select at least one of the plurality of receive beams by choosing at least one receive beam if the received signal strength metric value exceeds a predetermined value. In selected embodiments, the digital signal processing controller is configured to lock the communication device onto the optimal receive beam to perform a cell search. In addition, the digital controller may be configured to compute each RSSI value by collecting M sets of samples, each corresponding to one of M directional receive beams, and computing an RSSI value from each of the M sets of samples, thereby generating, for each receive beam, a power or energy measure indication of SSB detection by said receive beam. In selected embodiments, multiple received signal strength metric values are computed for each receive beam in one or more receiver sweep periods. In other embodiments, multiple received signal strength metric values are values computed over a frequency domain for each receive beam in one or more receiver sweep periods. In other embodiments, the digital signal processor is configured to select the optimal receive beam by selecting a first plurality of receive beams based on a ranking of the plurality of received signal strength metric values and by sequentially locking the communication device onto each of the first plurality of receive beams, strongest one first, to perform a cell search. In addition, the digital signal processor may be configured to perform the cell search with a weighted linear combination of one or more of the first plurality of receive beams.

The methods and systems for establishing initial cell acquisition with a two-stage method which sweeps the UE's receive beams during each SSB transmit beam of a first SSB burst to compute RSSI measurements which are used to identify an optimal receive beam for completing cell acquisition during a second SSB burst in a 5G and millimeter-wave wireless communication system as shown and described herein may be implemented in whole or in part with software stored on a computer-readable medium and executed as a computer program on a general purpose or special purpose computer to perform certain tasks. For a hardware implementation, the elements used to perform various signal processing steps at the transmitter (e.g., receiving a SSB, designing the transmit beamforming vectors for a plurality of transmit beams, periodically transmitting the SSB over the transmit beams during a series of SSB bursts, and so on) and/or at the receiver (e.g., designing receive beamforming vectors for a plurality of receive beams, sweeping the receive beams to recover the transmitted SSB signal during each transmit beam, demodulating and decoding the recovered SSB signals, performing receive signal processing on samples received from the recovered SSB signals to calculate RSSI values for each receive beam, evaluating the RSSI values with vector processing techniques to select an optimal receive beam, performing a cell search using the optimal receive beam by searching for a synch pattern during a second SSB burst, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein focus on 5G and mm-wave systems and methods for using same, the present invention is not necessarily limited to the example embodiments illustrate herein and may be applied to any wireless system that uses beamforming to extend signal range, coverage and/or throughput.

For example, various embodiments of an initial cell search system and design methodology disclosed herein may be implemented in connection with various proprietary or wireless communication standards, such as IEEE 802.16e, 3GPP-LTE, 4GPP-LTE, 5GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed at a user equipment device to make initial access with a base station in a multiple antenna system, comprising:
   continuously sweeping a plurality of receive beams RX1-RXM over one or more receiver sweep periods $T_R$ at the user equipment device to detect one or more synchronization signal blocks (SSB) transmitted by the base station in different transmit beams, where each receiver sweep period $T_R$ has a duration that equals an SSB transmit duration $T_{Ti}$ of each SSB transmitted at each transmit beam;
   generating, for each receive beam RXi, a received signal strength metric value, thereby generating a plurality of received signal strength metric values;
   selecting at least one of the plurality of receive beams as an optimal receive beam based on a ranking of the plurality of received signal strength metric values; and
   locking the user equipment device onto the optimal receive beam to perform a cell search.

2. The method of claim 1, where the multiple antenna system comprises a millimeter-wave wireless system.

3. The method of claim 1, where continuously sweeping the plurality of receive beams comprises applying a plurality of receive beamforming weights to a multi-antenna subsystem at the user equipment device to directionally orient each of the plurality of receive beams in a different direction over the receiver sweep period.

4. The method of claim 1, where continuously sweeping the plurality of receive beams comprises repeatedly sweeping the plurality of receive beams for adjacent receiver sweep periods to detect at least a first synchronization signal block (SSB) transmitted by the base station in a transmit beam in a plurality of SSB bursts.

5. The method of claim 1, where continuously sweeping the plurality of receive beams comprises continuously sweeping a plurality of M receive beams in a circular round-robin fashion for N times over a receiver sweep period to detect one or more synchronization signal blocks (SSB) transmitted by the base station in different transmit beams, where the receiver sweep period equals a transmit beam duration for transmitting a single SSB.

6. The method of claim 1, where generating the received signal strength metric value comprises generating, for each receive beam, a received signal strength indicator (RSSI) value from samples of each transmitted SSB received in said receive beam, thereby generating a plurality of RSSI values.

7. The method of claim 1, where selecting at least one of the plurality of receive beams comprises choosing at least one receive beam if the received signal strength metric value exceeds a predetermined value.

8. A wireless device (WD) comprising:
a multiple antenna subsystem and beamformer subsystem connected to and configured by a digital controller to wirelessly make initial access with an access node (AN) by:
continuously sweeping a plurality of receive beams RX1-RXM over one or more receiver sweep periods $T_R$ at the WD to detect one or more synchronization signal blocks (SSB) transmitted by the AN in different transmit beams, where each receiver sweep period $T_R$ equals an SSB transmit duration $T_B$ of each SSB transmitted by the AN at each transmit beam;
generating, for each receive beam, a received signal strength metric value from samples of each transmitted SSB measured in said receive beam, thereby generating a plurality of received signal strength metric values;
selecting at least one of the plurality of receive beams as an optimal receive beam based on a ranking of the plurality of received signal strength metric values; and
locking the WD onto the optimal receive beam to perform a cell search.

9. The wireless device of claim 8, where the multiple antenna system comprises a millimeter-wave antenna array that is configurable for communicating with a millimeter wave radio access technology (mmW RAT) system.

10. The wireless device of claim 8, where the beamformer subsystem comprises an analog beamformer subsystem.

11. The wireless device of claim 8, where the digital controller is configured to sweep the plurality of receive beams by applying a plurality of receive beamforming weights to the multiple antenna subsystem to directionally orient each of the plurality of receive beams in a different direction over the receiver sweep period.

12. The wireless device of claim 8, where the digital controller is configured to continuously sweep the plurality of receive beams by repeatedly sweeping the plurality of receive beams for adjacent receiver sweeps to detect at least a first synchronization signal block (SSB) transmitted by the AN in a transmit beam in a plurality of SSB bursts.

13. The wireless device of claim 8, where the digital controller is configured to continuously sweep the plurality of receive beams by continuously sweeping a plurality of m receive beams in a circular round-robin fashion for N times over a receiver sweep period to detect one or more synchronization signal blocks (SSB) transmitted by the AN in different transmit beams, where the receiver sweep period equals a transmit beam duration for transmitting a single SSB.

14. The wireless device of claim 8, where the digital controller is configured to select at least one of the plurality of receive beams by choosing at least one receive beam if the received signal strength metric value exceeds a predetermined value.

15. The wireless device of claim 8, where selecting at least one of the plurality of receive beams comprises selecting a first plurality of receive beams based on a ranking of the plurality of received signal strength metric values; and
where locking the WD onto the optimal receive beam comprises sequentially locking the WD onto each of the first plurality of receive beams, strongest one first, to perform a cell search.

16. A communication device for making initial access with a base station in a multiple antenna wireless communication system, comprising:
a multi-antenna array;
a beamformer connected to apply a plurality of receive beamforming weights to the multi-antenna array to directionally orient each of a plurality of receive beams RX1-RXM in a different direction over a receiver sweep period $T_R$ to continuously sweep the plurality of receive beams in a round robin manner during a first synchronization signal block (SSB) burst transmitted to the communication device to detect one or more synchronization signal blocks (SSB) transmitted by the base station in different transmit beams, where each receiver sweep period $T_R$ equals an SSB transmit duration $T_B$ of each SSB transmitted in the first SSB burst; and
a digital signal processing controller connected to select at least one of the plurality of receive beams as an optimal receive beam based on a ranking of a plurality of received signal strength metric values, where each received signal strength metric value is computed for each receive beam from samples of each transmitted SSB measured in said receive beam.

17. The communication device of claim 16, where the multi-antenna array comprises a millimeter-wave antenna array that is configurable for communicating with a millimeter wave radio access technology (mmW RAT) system.

18. The communication device of claim 16, where the digital signal processing controller is configured to lock the communication device onto the optimal receive beam to perform a cell search.

19. The communication device of claim 16, where the beamformer is configured to sweep the plurality of receive beams by repeatedly sweeping the plurality of receive beams for adjacent receiver sweeps to detect a synchronization signal block (SSB) transmitted by the base station in a transmit beam.

20. The communication device of claim 16, where the digital signal processing controller is configured to select at least one of the plurality of receive beams by choosing at least one receive beam if the received signal strength metric value exceeds a predetermined value.

21. The communication device of claim 20, where multiple received signal strength metric values are computed for each receive beam in one or more receiver sweep periods.

22. The communication device of claim 21, where multiple received signal strength metric values comprise values computed over a frequency domain for each receive beam in one or more receiver sweep periods.

23. The communication device of claim 16, where the digital signal processor is configured to select the optimal receive beam by selecting a first plurality of receive beams based on a ranking of the plurality of received signal strength metric values and by sequentially locking the communication device onto each of the first plurality of receive beams, strongest one first, to perform the cell search.

24. The communication device of claim 16, where the digital signal processor is configured to perform the cell search with a weighted linear combination of one or more of the first plurality of receive beams.

\* \* \* \* \*